United States Patent [19]

Duncan

[11] 4,172,650
[45] Oct. 30, 1979

[54] FILM CASSETTE HAVING FOCAL PLANE SHUTTER

[75] Inventor: Robert C. Duncan, Weston, Mass.

[73] Assignee: Polaroid Corporation, Cambridge, Mass.

[21] Appl. No.: 850,552

[22] Filed: Nov. 11, 1977

[51] Int. Cl.² .......................... G03B 9/28; G03B 1/00; G03B 17/42; G03C 3/00
[52] U.S. Cl. .................................. 354/212; 354/205; 96/201; 354/241
[58] Field of Search ............................... 354/241–245, 354/248, 146, 205, 275, 276, 212, 319, 173; 96/200, 201

[56] References Cited

U.S. PATENT DOCUMENTS

| | | | |
|---|---|---|---|
| 462,116 | 10/1891 | Ellis et al. | 354/241 X |
| 650,787 | 5/1900 | Wright et al. | 354/241 |
| 1,003,536 | 9/1911 | Spinks | 354/241 |
| 1,075,751 | 10/1913 | Barberie | 354/241 |
| 2,584,964 | 2/1952 | Jacobson | 354/205 |
| 3,511,152 | 5/1970 | Erlichman | 354/319 |
| 3,550,515 | 12/1970 | Erlichman | 354/173 |
| 3,587,426 | 6/1971 | Erlichman | 96/201 X |
| 3,918,077 | 11/1975 | Burton et al. | 354/248 X |

FOREIGN PATENT DOCUMENTS

| | | | |
|---|---|---|---|
| 16072 | of 1901 | United Kingdom | 354/241 |
| 183492 | 8/1922 | United Kingdom | 354/241 |

*Primary Examiner*—L. T. Hix
*Assistant Examiner*—Thomas H. Tarcza
*Attorney, Agent, or Firm*—Alfred E. Corrigan

[57] ABSTRACT

A shutterless camera and a film assemblage specifically adapted for use therewith. The film assemblage includes a cassette having an exposure opening and an ingress opening in one wall thereof and an egress opening in another wall. Mounted within the cassette is a focal plane shutter having an exposure aperture therein which is adapted to be driven across a photosensitive area of a film unit to expose the same. The camera includes a motor which is adapted to drive the shutter, i.e., actuate the shutter, thereby exposing a film unit, and film advancing apparatus which is adapted to extend into the ingress opening in the cassette to engage and move the exposed film unit out of the cassette.

12 Claims, 7 Drawing Figures

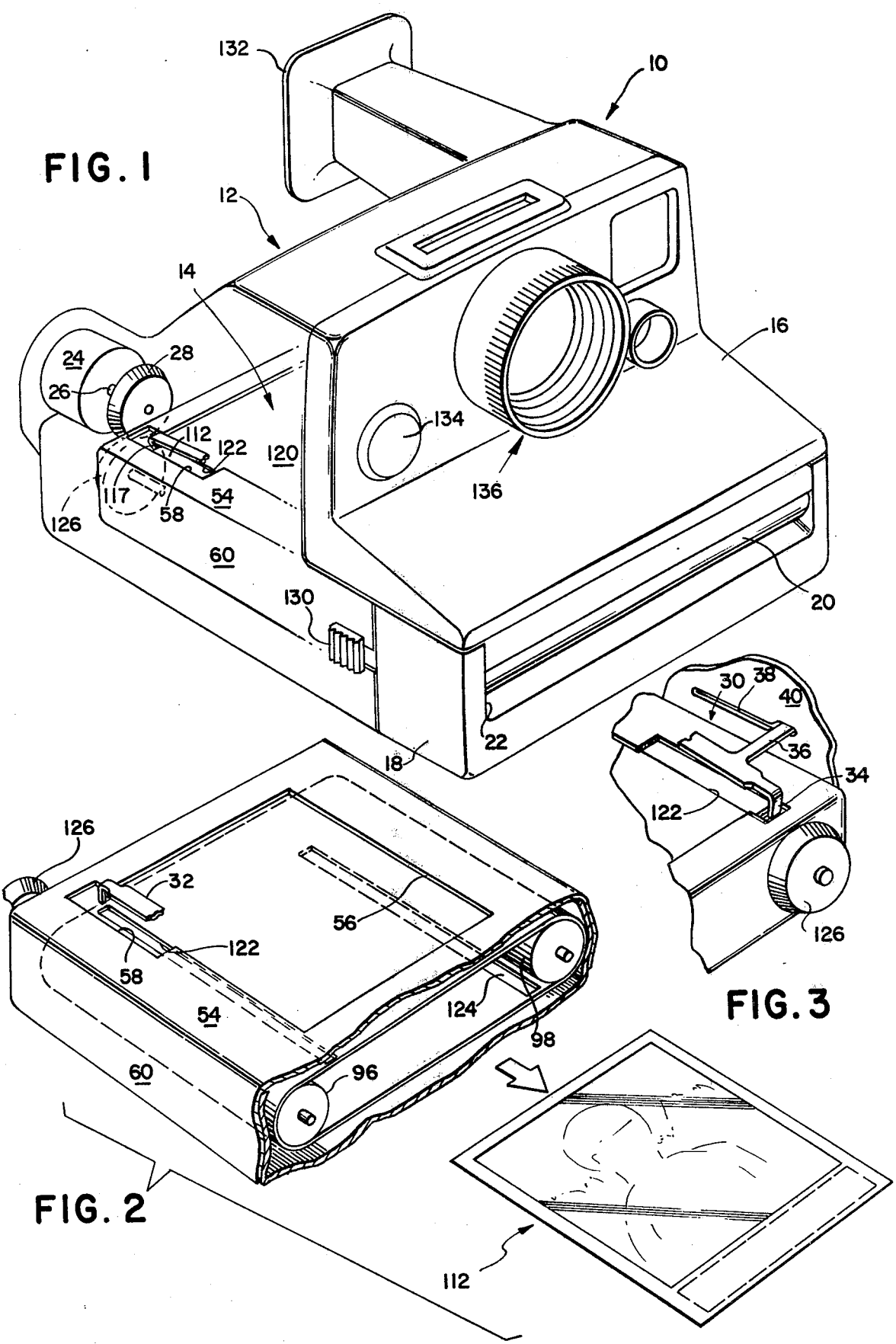

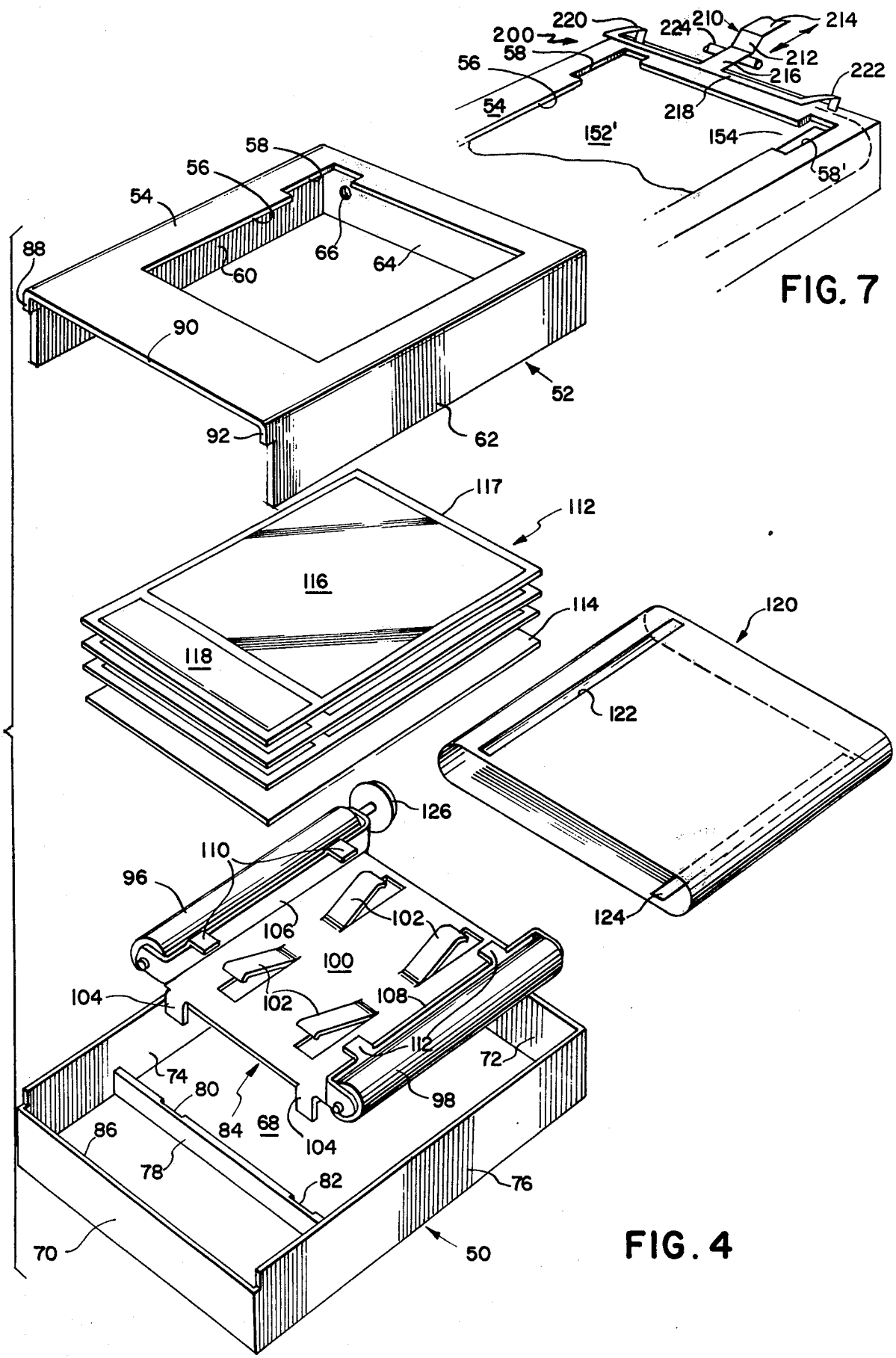

FILM CASSETTE HAVING FOCAL PLANE SHUTTER

BACKGROUND OF THE INVENTION

1. Field of the Invention

This invention relates to film assemblages of the type having a focal plane shutter and to shutterless cameras especially adapted for use therewith.

2. Description of the Prior Art

The prior art is relatively quiet on the subject of film assemblages having a focal plane shutter mounted therein and cameras especially adapted for use therewith. A teaching of such a film assemblage may be found in U.S. Pat. No. 462,116, granted to Ellis et al. on Oct. 27, 1891. This patent shows and describes a film assemblage comprised of a plate holder having an exposure opening therein, a plurality of film units located in alignment with the exposure opening and a shutter made from an opaque flexible sheet such as cloth. A pair of rollers within the cassette provide a means for mounting the shutter for movement between a film unit located in position for exposure and the exposure opening in the plate holder. In one position the shutter completely covers the exposure opening thereby preventing exposure of the film unit. In another position the shutter is out of alignment with the film unit thereby enabling its exposure.

The operation of the Ellis et al. device is not clear but it appears that one mounts the film assemblage to a camera and after actuating the shutter to uncover the exposure opening, removes the film assemblage from the camera. The film assemblage including the exposed film unit is then attached or mounted to a receiver and the shutter is partially actuated to uncover the exposure opening in the plate holder. The exposed film unit is then moved from the plate holder into the receiver via the uncovered exposure opening. The shutter is then partially actuated again to move it to a position wherein it completely covers the exposure opening thereby permitting the plate holder to be removed from the receiver without prematurely exposing the next film unit. Obviously, the demounting of the film assemblage from the camera after each exposure and its subsequent reattachment to the camera for the next exposure leaves much to be desired.

U.S. Pat. No. 3,550,515 granted to I. Erlichman on Dec. 29, 1970 shows a film assemblage comprising a cassette having an exposure opening in one wall thereof, and an egress opening in another wall thereof. Mounted within the cassette are a plurality of film units and an endless belt having an opening therein which is adapted to be moved into alignment with the exposure opening in the cassette prior to photographically exposing one of the film units. After each exposure of a film unit, the belt is driven to move the exposed film unit toward the exterior of the cassette via the egress opening. However, Erlichman does not teach or suggest that his endless belt could be used as a focal plane shutter.

SUMMARY OF THE INVENTION

The instant invention relates to a film assemblage of the type having a focal plane shutter mounted therein and to a camera especially adapted for use therewith. A typical film assemblage includes a cassette for housing a plurality of film units. The cassette has an exposure opening and at least one ingress opening in one wall thereof and an egress opening in another wall. Resilient means and a platen are provided for supporting the film units in a stack such that the topmost film unit in the stack is urged into a position wherein its leading edge is located in alignment with the egress opening, its trailing edge is located in alignment with the ingress opening and its photosensitive area is located in alignment with the exposure opening. Also mounted within the cassette is a focal plane shutter which may be constructed from any suitable flexible material and a pair of rollers for supporting the shutter, at least one of the rollers being adapted to be driven by suitable drive means located within a camera. The shutter preferably takes the form of a belt having at least one exposure aperture therein. The belt is mounted on the rollers such that during the exposure of a film unit the portion of the belt containing the exposure aperture travels across the photosensitive area of the film unit thereby permitting light to travel therethrough to photographically expose the film unit. In one embodiment the focal plane shutter is an endless belt thereby permitting the belt to be driven in the same direction for each exposure. In another embodiment the focal plane shutter is a belt having opposite ends, each of which is attached to one of the rollers such that the belt is driven in one direction for one exposure and in an opposite direction for the next exposure.

The camera is of the shutterless type and includes a film chamber for locating a film assemblage of the type described above in position for exposure of one of the film units contained therein. Mounted adjacent one end of the film chamber is a drive means comprised of a motor and a gear. Preferably the gear is mounted in position to be operatively engaged by a gear fixedly mounted on one of the rollers in the film assemblage such that when the motor is momentarily energized the one roller is positively driven thereby driving the belt and exposing a film unit. The camera also includes film advancing apparatus which is adapted to extend into the film cassette via the ingress opening and advance the film unit, subsequent to being exposed, toward the exterior of the cassette by way of the egress opening. In one embodiment, the film advancing apparatus includes two film unit engaging members as will be more fully described later.

An object of the invention is to provide a film assemblage including a cassette having an exposure opening and an egress opening through which an exposed film unit may be moved toward the exterior of the cassette with a focal plane shutter.

Another object of the invention is to provide a film assemblage with a focal plane shutter having an exposure aperture therein dimensioned to (1) completely expose the photosensitive layer of a film unit as it passes thereover and (2) allow the passage of a portion of a film advancing apparatus therethrough so as to engage and move the exposed film unit out of its exposure position.

Still another object of the invention is to provide a camera with means for driving a focal plane shutter located within a film assemblage, the driving means being automatically coupled to the focal plane shutter upon locating the film assemblage within the camera for exposure of a film unit contained therein.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view, partly in section, of a camera having a film assemblage located therein;

FIG. 2 is a perspective view of the film assemblage shown in FIG. 1 with portions removed for clarity;

FIG. 3 is a perspective view of a corner of the film assemblage of FIG. 2;

FIG. 4 is an exploded perspective view of the film assemblage shown in FIG. 2;

FIG. 7 is a perspective view of a portion of an alternative form of film assemblage which is adapted for use with a camera of the type having a dual film engaging apparatus.

DETAILED DESCRIPTION OF THE INVENTION

Figure 5:
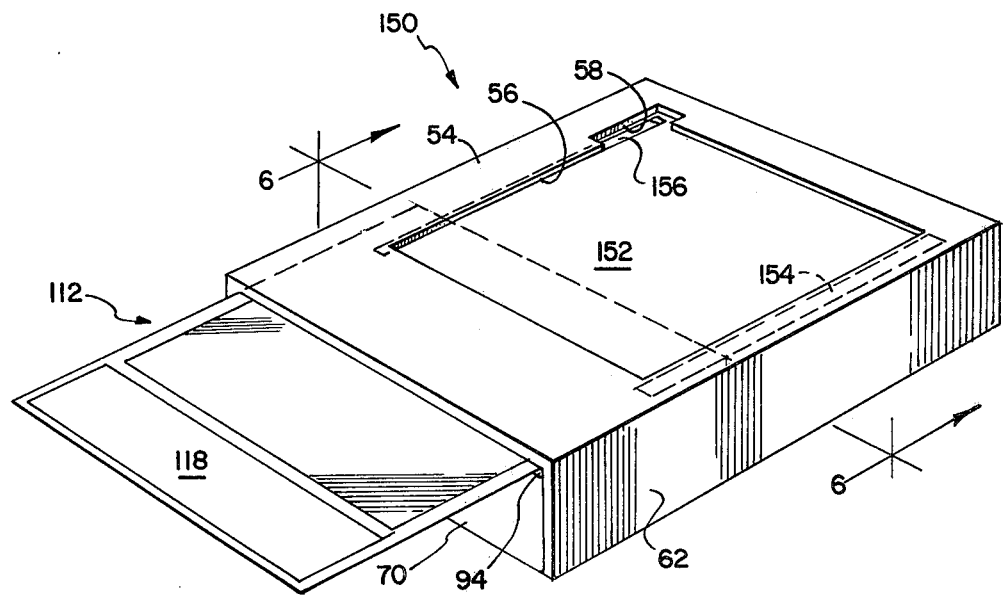
FIG. 5 is a perspective view of still another film assemblage.

Reference is now made to FIG. 1 of the drawings wherein is shown a camera 10 which is preferably of the self-developing or instant type. The camera 10 includes a housing section 12 which generally defines a chamber 14 for receiving and locating a film assemblage in position for exposure of one of the film units contained therein. The housing section 12 has an open end which is effectively closed off by a generally L-shaped housing section 16 and a spread roller housing section 18 having mounted therein a pair of elongate spread rollers (not shown) and a coiled opaque shade 20 which extends across a film unit exit slot 22 in the spread roller housing section 18, as is more fully described in U.S. Pat. No. 4,016,578. The spread roller housing section 18 is coupled to the housing section 12 for pivotal movement in a clockwise manner from the position shown in FIG. 1 to a film assemblage loading position wherein access to the chamber 14 is provided.

Mounted adjacent one end of the chamber 14 is a motor 24. The motor 24 is adapted to be momentarily energized to drive a shaft 26 which has a gear 28 attached to one end thereof. Mounted along one side of the chamber 14 is a film advancing apparatus shown schematically at 30. The film advancing apparatus 30, which may be of the type similar to that described in U.S. Pat. No. 3,984,852, includes a resilient arm 32, a portion 34 of which is adapted to extend downwardly into the film assemblage to engage an exposed film unit, preferably at its trailing edge, and move it away from its exposure position. Extending from one side of the arm 32 is a cam follower 36 which rides in a cam track 38 formed in a stationary plate 40. The cam follower 36 and the cam track 38 coact with each other to move the film engaging portion 34 downwardly to a position just rearwardly of the trailing edge of the exposed film unit as the arm moves in the direction of the spread roller housing section. The cam follower 36 is located in the right hand or elevated section of the cam track 38 at the beginning and at the end of each reciprocation of the arm 34 thereby maintaining the film engaging portion 34 out of the path of travel of the film assemblage's focal plane shutter, as will be more fully described hereinafter.

A preferred embodiment of a film assemblage for use with the camera 10 is shown in detail in FIGS. 2-4. The film assemblage includes a film cassette comprising a lower portion 50 and an upper portion 52 which is structured to telescopically receive the lower portion 50 to form a chamber for housing the other elements of the assemblage. The upper portion 52 includes a forward wall 54 having an exposure opening 56 and an ingress opening 58 therein. Extending downwardly from the wall 54 are two side walls 60 and 62 which are interconnected by a trailing end wall 64 having an opening 66 therein. The bottom portion 50 includes a rear wall 68, leading and trailing end walls 70 and 72, respectively, and a pair of side walls 74 and 76. The end wall 72 has an opening (not shown) which is adapted to be located in line with the opening 66 when the two portions 50 and 52 are nested together. Molded integrally with the rear wall 68 is a flange 78 having a pair of spaced slots 80 and 82 therein for properly locating a roller supporting frame 84 within the bottom portion 50. When the lower portion 50 has been telescopically received by the upper portion 52, an edge 86 of the leading end wall 70 cooperates with the edges 88, 90 and 92 of the upper portion 52 to define an egress opening 94 (see FIG. 5) in the leading end wall of the film cassette, said opening 94 being dimensioned to permit the passage of only one film unit at a time therethrough.

The film assemblage also includes the aforementioned frame 84 which supports a pair of rollers 96 and 98. The frame 84, which is preferably constructed from a single sheet of material, includes a base 100 having four cantilever-like fingers 102 partially stamped out of the base to provide a resilient means for urging the film units toward the exposure opening 56. Extending downwardly from opposite ends of the base are four legs 104 (only two of which are shown) which are of a length sufficient to space the rollers 96 and 98 from the rear wall 68. The two legs 104 which are not shown are adapted to engage, or be positioned closely adjacent to, the interior surface of the trailing end wall 72 while the other two legs 104 are adapted to be received within the slots 80 and 82 thereby precluding movement of the frame 100 in a horizontal plane. Each side of the base 100 is upwardly and outwardly bent or formed to define U-shaped brackets 106 and 108 having suitable bearings therein for rotatably supporting the journals of the rollers 96 and 98. Extending inwardly from each U-shaped bracket 106 and 108 are a pair of tabs 110 and 112 which function as stops to limit the movement of the uppermost film unit in the stack to a position just out of engagement with the focal plane shutter.

Also included in the film assemblage are a plurality of film units 112 of a type similar to those described in U.S. Pat. Nos. 3,415,644 and 3,672,890 which are adapted to be supported in a stack by a platen 114. As is well known in the art, each film unit 112 includes a transparent sheet 116 which overlies the photosensitive layer of the film unit and a rupturable pod 118 having a processing fluid located therein positioned at the leading end of the film unit.

The film assemblage is completed by a focal plane shutter in the form of an endless belt 120 having a pair of exposure apertures 122 and 124 located on opposite sides thereof. The belt 120, which may be constructed from any suitable opaque material, is adapted to encompass or surround the roller supporting frame 84, the platen 114 and the film units 116 and to be supported in such relationship by the rollers 96 and 98. The lowermost portion of the belt 120 is spaced from the rear wall 68 by the legs 104 while the upper portion thereof is spaced slightly above the stops 110 and 112 by the surfaces of the rollers 96 and 98.

The means for mounting the focal plane shutter 120 for movement so as to photographically expose the uppermost film unit 112 in the stack include the rollers 96 and 98 and a gear 126 which is secured to one of the journals of the roller 96, the said journal passing through the opening 66 and the opening in the end wall 72.

When the photographic film assemblage is put together, the relationship between the belt 120 and the uppermost film unit 112 in the stack of film units is such that the exposure aperture 122 is located adjacent one side of the film unit, i.e., the front side, and is in alignment with the ingress opening 58 and out of alignment with the exposure opening 56 in the film cassette; and the exposure aperture 124 is located adjacent an opposite side of the film unit, i.e., the rear side of the film unit, and is out of alignment with the exposure opening 56. So assembled, the photographic film assemblage 50 may be exposed to the ambient light without fear of prematurely exposing a film unit during loading of the film assemblage into the camera 10 since the exposure opening 56 in the film cassette is completely covered by the opaque portion of the belt 120.

The camera is prepared for loading by the user moving a latch release button 130 to the right, as viewed in FIG. 1, to permit the spread roller section 18 to be pivoted in a clockwise manner into a position wherein the film assemblage 50 may be inserted into the film chamber 14 via its open end. As the film assemblage 50 is inserted into the film chamber 14, its side walls 60 and 62 and its rear wall 68 are engaged by the walls of the film chamber so as to guide the film assemblage into position for exposure of the uppermost film unit 112 in the film cassette. As the film assemblage is entering this position, the gear 126 moves into mesh with the gear 28, the enmeshment being facilitated by the taper of the faces of the gears, as shown in FIG. 1. Thus positioned, the film assemblage 50 is then secured within the film chamber 14 by pivoting the spread roller housing section 18 in a counterclockwise direction into the position shown in FIG. 1. After the subject is viewed through a viewfinder 132, an exposure initiating button 134 is depressed to momentarily close an electrical circuit between the camera's power supply (not shown) and the motor 24 to cause the gear 28 to rotate in a counterclockwise direction, as viewed in FIG. 1, thereby actuating the focal plane shutter or belt 120 through the gear 126. This actuation results in the exposure aperture 122 moving to the position previously occupied by the exposure aperture 124, i.e., the exposure aperture 122 moves from the position previously identified in detail to a second position wherein it is out of alignment with the ingress opening 58 and the exposure opening 56 and is located adjacent to an opposite side of the film unit. Simultaneously therewith, the exposure aperture 124 moves into the position previously occupied by the exposure aperture 122 at the start of the exposure cycle. The focal plane shutter is stopped in this latter position by opening the circuit between the power source and the motor 24 or by dynamically braking the motor, i.e., opening the circuit and momentarily reversing the current to the motor. During this movement of the belt 120, the exposure aperture 122 scans the photosensitive layer of the uppermost film unit thereby exposing it to image bearing rays which enter the film chamber via a lens assembly 136 and are reflected onto the photosensitive layer by a mirror (not shown) mounted on an interior surface of the housing section 12.

After the film unit has been exposed, the film advancing apparatus is actuated in a reciprocal manner to move the film engaging portion 34 from its rearwardmost position to its forwardmost position and then back to its rearwardmost position. During such movement the cam follower 36 follows the scan track 38 to cause the film engaging portion 34 to be lowered into the film cassette via the ingress opening 58 and the exposure aperture 124. The film engaging portion 34 moves to a position wherein it engages the trailing edge 117 of the uppermost film unit and moves it away from its exposure position via the egress opening 94 in the leading end wall of the film cassette. As the leading end of the emerging film unit exits from the film cassette it enters the bite of the spread rollers (not shown) mounted within the spread roller housing section 18. The spread rollers rupture the pod 118 and spread its contents across the photosensitive layer of the exposed film unit while simultaneously advancing the film unit toward the exterior of the camera 10. Before the leading edge of the exposed film unit exits from the camera 10 it engages and unrolls the opaque shade 20 thereby progressively covering the emerging film unit so as to prevent further exposure of the photosensitive layer to the ambient light. As the trailing end of the exposed film unit moves out of engagement with the spread rollers, the opaque shade disengages itself from the leading edge of the film unit and rewinds itself into its coiled configuration where it cooperates with other camera structure to releasably retain the film unit by its trailing end until the user wishes to detach it from the camera.

Figure 6:
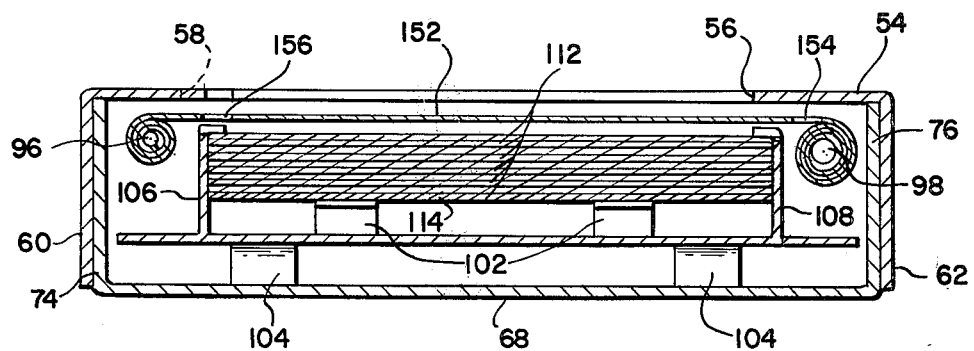
FIG. 6 is a cross-sectional view of the film assemblage shown taken along the line 6—6 in FIG. 5.

Reference is now made to FIGS. 5 and 6 of the drawings wherein is shown an alternative embodiment of the invention. This embodiment shows a film assemblage 150, which is identical to that shown in FIG. 4 except for the focal plane shutter and the manner in which it is driven. Specifically, the film assemblage 150 includes a focal plane shutter 152 having an elongate exposure aperture 154 and a second aperture 156 formed therein. The exposure aperture 154, like all of the exposure apertures described herein, is of a length which is slightly greater than the length of the photosensitive layer of the film unit as measured in the direction of travel of the film unit, i.e., the exposure aperture extends from a point just rearwardly of the trailing edge 117 of a film unit 112 to the pod 118 located at the leading edge of the film unit. The focal plane shutter 152 is formed from an opaque strip of material having opposite ends 158 and 160 which are suitably secured to the rollers 96 and 98, respectively. The roller 98 is provided with a gear (not shown) similar to that shown at 126 in FIGS. 1-4 and the camera 10 is provided with a gear train for coupling the gears on the rollers 96 and 98 for simultaneous rotation in the same direction.

After the film assemblage 150 has been secured within the film chamber 14 and the subject to be photographed has been properly focused, actuation of the exposure initiating button 134 momentarily closes an electrical circuit to the motor 24 to cause the gear 28 to rotate in a clockwise manner thereby causing the rollers 96 and 98 to rotate in a counterclockwise manner until the exposure aperture 154 has moved from right to left, as viewed in FIGS. 5 and 6 until it reaches the position previously occupied by the aperture 156. Stated another way, the focal plane shutter 152 having the first and second apertures 156 and 154, respectively, therein is moved between a first position (that shown in FIGS. 5 and 6) wherein the first aperture 156 is located adjacent one side of a film unit (the left side) and is in alignment with the ingress opening 58 and out of alignment with the exposure opening 56 and the second aperture, i.e., the exposure aperture 154 is located adjacent an opposite side of the film unit (the right side) and is out of alignment with the exposure opening 56; and a second position wherein the first aperture 156 is wound upon the roller 96 and thereby out of alignment with the ingress and exposure openings 58 and 56, respectively, and the second aperture 154 is in alignment with the ingress opening 58 and out of alignment with the exposure opening 56. As stated previously, the exposure aperture 154 is dimensioned to completely expose the photosensitive layer of the uppermost film unit in the stack as it passes thereover during said movement between said first and second positions and is dimensioned to allow the passage of the portion 34 of the film advancing apparatus therethrough so as to engage said film unit prior to moving it out of its exposure position via egress opening 94 and to the exterior of the camera in the manner described previously. When the exposure initiating button is depressed again the circuit to the motor is momentarily closed so as to reverse the direction of the current to the motor. This action causes the motor 24 to rotate the gear 28 in a counterclockwise manner thereby causing the rollers 96 and 98 to rotate in a clockwise manner until the exposure aperture 154 has moved from the left side of the uppermost film unit to the position shown in FIGS. 5 and 6. The film engaging portion 34 of the film advancing apparatus now enters the film cassette via the ingress opening 58 and the aperture 156 in the focal plane shutter 152. When the exposure initiating button is depressed for the third exposure, the sequence of events is the same as that described for the first exposure.

Reference is now made to FIG. 7 wherein is shown still another embodiment of the instant invention. In FIG. 7 there is shown a film assemblage 200 which is identical to the film assemblage 150 except for two things, i.e., the forward wall 54 of the film cassette is provided with a second ingress opening 58' located on the right side of the exposure opening 56 and the focal plane shutter 152' is provided with only one aperture, namely the exposure aperture 154.

The camera is provided with a film advancing apparatus 210 which includes a cantilevered portion including an arm having a ramp section 212 connecting two generally parallel portions 214 and 216. The portion 216 is integrally formed with an arm 218 having at its opposite ends two rearwardly and downwardly extending resilient film unit engaging portions 220 and 222. As shown in FIG. 7, a cam 224 is positioned in engagement with the portion 216 for maintaining the film advancing apparatus 210 in an up position thereby insuring that the film engaging portions are not in contact with the focal plane shutter 152' when it is being actuated in the manner described with reference to the embodiment shown in FIGS. 5 and 6.

The first film unit 112 in the stack is exposed by actuating the focal plane shutter 152' so as to cause the exposure aperture 154 to move from the position shown in FIG. 7 across the film unit and finally into alignment with the ingress opening 58. The film advancing apparatus 210 is then energized to move the arm 218 forwardly toward the egress opening 94 in the film cassette thereby causing the ramp 212 to move into engagement with the cam 224 to gradually lower the film engaging portions 220 and 222. At this point it should be noted that when the top of the ramp 212 is in engagement with the cam 224, the film engaging portions 220 and 222 would normally be located behind the trailing edge 117 of the exposed film unit. However, at this time, i.e., after the first exposure, the film engaging portion 222 cannot move to its position behind the film unit because there is no aperture in alignment with the ingress opening 58'. As the portion 222 moves downwardly toward the exposed film unit it engages the focal plane shutter 152'. Continued downward motion of the arm 218 causes the film engaging portion 220 to pass through the exposure aperture 154 to a position behind the trailing edge 117 of the exposed film unit while simultaneously the film engaging portion 222 is being raised relative to the arm 218. As the portion 214 moves into engagement with the cam 224, the exposed film unit is engaged at its trailing edge 117 by the film engaging portion 220 and moved out of its exposure position as previously described. The film advancing apparatus, after moving the exposed film unit into engagement with the motor driven spread rollers, is returned to the position shown in FIG. 7 in preparation for the next exposure. As in the embodiment shown and described with reference to FIGS. 5 and 6, the second actuation of the exposure initiating button 134 causes the focal plane shutter 152' to move in an opposite direction thereby moving the exposure aperture 154 from its position in alignment with the ingress opening 58, across the photosensitive layer of the film unit, and finally into alignment with the ingress opening 58'. Now, when the film advancing apparatus 210 is reciprocated, the film engaging portion 222 moves through the exposure aperture 154 to a position behind the trailing edge 117 of the exposed film unit while the film engaging portion 200 is prevented from moving to its corresponding position by the focal plane shutter 152'.

Since certain changes may be made in the above apparatus and film assemblages without departing from the scope of the invention herein involved, it is intended that all matter contained in the above description and shown in the accompanying drawings shall be interpreted as illustrative and not in a limiting sense. For example, while gears have been shown as the primary means for driving the focal plane shutter, it is intended that the scope of the invention covers alternative means such as friction rollers or a sprocket drive wherein the focal plane shutter is provided with a series of small apertures for receiving the teeth of the sprocket wheel. Further, it is not intended that the exposure apertures in the described focal plane shutters be limited to elongate rectangular slots but that they may have their configuration varied so as to accommodate film units having different film speeds.

What is claimed is:
1. A photographic film assemblage comprising:
a cassette for housing a plurality of film units, said cassette including a wall having means defining an exposure opening through which a film unit may be exposed and an ingress opening through which a portion of a film advancing apparatus of a camera may extend into the interior of said cassette to engage an exposed film unit and advance it out of its exposure position;

a plurality of film units located within said cassette with one of said film units located in alignment with said exposure opening;

an opaque focal plane shutter mounted between said one film unit and said exposure opening, said focal plane shutter including first and second apertures therein both of which are dimensioned to completely expose the photosensitive area of said one film unit as they pass thereover and to allow passage of the portion of the film advancing apparatus therethrough so as to engage and move said one film unit out of said exposure position after exposure thereof; and means for mounting said focal plane shutter for movement between a first position wherein said first aperture is located adjacent one side of said one film unit and is in alignment with said ingress opening and out of alignment with said exposure opening and said second aperture is located adjacent an opposite side of said one film unit and is out of alignment with said exposure opening, and a second position wherein said first aperture is out of alignment with said ingress and exposure openings and said second aperture is in alignment with said ingress opening and out of alignment with said exposure opening, said first aperture completely exposing the photosensitive area of said one film unit as it passes thereover during said movement between said first and second positions.

2. A photographic film assemblage as defined in claim 1 wherein said focal plane shutter is an endless belt.

3. A photographic film assemblage as defined in claim 2 wherein said second aperture, when in said second position, is in position to move across the photosensitive area of the next film unit to be exposed when said focal plane shutter is actuated to return it to said first position.

4. A photographic film assemblage comprising:
a cassette for housing a plurality of film units, said cassette including a wall having means defining an exposure opening through which a film unit may be exposed and an ingress opening on opposite sides of said exposure opening through which a portion of a film advancing apparatus of a camera may extend into the interior of said cassette to engage an exposed film unit and advance it out of its exposure position;

a plurality of film units located within said cassette with one of said film units located in alignment with said exposure opening;

an opaque focal plane shutter mounted between said one film unit and said exposure opening, said focal plane shutter having an aperture therein; and means for mounting said focal plane shutter for movement between a first position wherein said aperture in said focal plane shutter is in alignment with one of said ingress openings and out of alignment with said exposure opening, and a second position wherein said aperture is in alignment with said other ingress opening and out of alignment with said exposure opening, said aperture in said focal plane shutter being dimensioned to completely expose the photosensitive area of said one film unit as it passes thereover during said movement between said first and second positions and to allow passage of a portion of the film advancing apparatus therethrough so as to engage said one film unit prior to moving said one film unit out of said exposure position.

5. A photographic film assemblage as defined in claim 4 wherein said mounting means is adapted to drive said focal plane shutter in a reciprocating manner such that said aperture in said focal plane shutter traverses said one film unit in one direction and traverses the next of said film units to be exposed in a direction opposite to said one direction.

6. A photographic film assemblage comprising: a cassette for housing a plurality of film units, said cassette including a first wall having means defining an egress opening through which a film unit may be advanced to the exterior of said cassette subsequent to being photographically exposed, and a second wall having means defining an exposure opening through which a film unit may be exposed and an ingress opening through which a portion of a film advancing apparatus of a camera may extend into the interior of said cassette to engage an exposed film unit and advance it toward the exterior of said cassette by way of said egress opening;

a plurality of film units located within said cassette with one of said film units located in alignment with said exposure opening;

an opaque focal plane shutter mounted between said one film unit and said exposure opening, said focal plane shutter including first and second apertures therein; and means for mounting said focal plane shutter for movement between a first position wherein said first aperture is located adjacent one side of said one film unit and is in alignment with said ingress opening and out of alignment with said exposure opening and said second aperture is located adjacent an opposite side of said one film unit and is out of alignment with said exposure opening, and a second position wherein said first aperture is out of alignment with said ingress and exposure openings and said second aperture is in alignment with said ingress opening and out of alignment with said exposure opening, said second aperture being dimensioned to completely expose the photosensitive area of said one film unit as it passes thereover during said movement between said first and second positions and said first and second apertures are dimensioned to allow passage of the portion of the film advancing apparatus therethrough so as to engage said one film unit prior to moving said one film unit at least partially out of said cassette by way of said egress opening.

7. A photographic film assemblage as defined in claim 6 wherein said mounting means is adapted to move said focal plane shutter in one direction for a first exposure of a film unit and in a generally opposite direction for the exposure of the next film unit to be exposed.

8. A photographic film assemblage as defined in claim 6 wherein said mounting means includes a pair of rollers and said focal plane shutter includes a sheet of flexible material having opposite ends secured to said pair of rollers.

9. A photographic film assemblage comprising:
a cassette for housing a plurality of film units, said cassette including a first wall having means defining an egress opening through which a film unit may be advanced to the exterior of said cassette subsequent to being photographically exposed, and a second wall having means defining an exposure opening through which a film unit may be exposed and an ingress opening on opposite sides of said exposure opening through which a portion of a film advancing apparatus of a camera may extend into the interior of said cassette to engage an exposed film unit and advance it toward the exterior of said cassette by way of said egress opening;

a plurality of film units located within said cassette with one of said film units located in alignment with said exposure opening;

an opaque focal plane shutter mounted between said one film unit and said exposure opening, said focal plane shutter having an aperture therein; and means for mounting said focal plane shutter for movement between a first position wherein said aperture in said focal plane shutter is in alignment with one of said ingress openings and out of alignment with said exposure opening, and a second position wherein said aperture is in alignment with said other ingress opening and out of alignment with said exposure opening, said aperture in said focal plane shutter being dimensioned to completely expose the photosensitive area of said one film unit as it passes thereover during said movement between said first and second positions and to allow passage of a portion of the film advancing apparatus therethrough so as to engage said one film unit prior to moving said one film unit at least partially out of said cassette by way of said egress opening.

10. A photographic film assemblage as defined in claim 9 wherein said mounting means is adapted to drive said focal plane shutter in a reciprocating manner such that said aperture in said focal plane shutter traverses said one film unit in one direction and traverses the next of said film units to be exposed in a direction opposite to said one direction.

11. A shutterless camera for use with a film assemblage of the type having means for actuating a focal plane shutter mounted within the film assemblage, said camera comprising:

means defining a chamber for receiving and locating the film assemblage in position for exposure of one of the film units contained therein;

drive means mounted in position to be operatively engaged by the focal plane shutter's actuating means when the film assemblage is positioned within said chamber;

a motor for momentarily energizing said drive means so as to drive the actuating means of the focal plane shutter to photographically expose one of the film units in the film assembly; and means constructed to extend through an opening in the focal plane shutter for engaging the exposed film unit and moving it out of its exposure position.

12. A shutterless camera as defined in claim 11 wherein said engaging means includes a pair of spaced film engaging members.

* * * * *